Nov. 21, 1933.                L. F. STONE                1,936,414
                      ELECTRIC MEASURING INSTRUMENT
                           Filed Nov. 9, 1931

Inventor:
Leland F. Stone,
by Charles E. Tullar
   His Attorney.

Patented Nov. 21, 1933

1,936,414

UNITED STATES PATENT OFFICE 1,936,414

ELECTRIC MEASURING INSTRUMENT

Leland F. Stone, Congers, N. Y., assignor to General Electric Company, a corporation of New York Application November 9, 1931. Serial No. 573,881

5 Claims. (Cl. 172—245)

My invention relates to electric measuring instruments employing electric valves and in particular to power-factor responsive devices.

The principal object of my invention is to provide means responsive to power-factor at relatively low loads and over a wide range of power-factors. Other and further objects will become apparent as the description proceeds.

Power-factor instruments used in the past have been dependent for their operation upon having a current of an appreciable magnitude flowing in the measured circuit. In instruments of the induction type, for example, the deflection of the moving element is produced by the mechanical force set up between a pair of members carrying respectively currents varying in phase and magnitude with the current in the measured circuit and currents varying in phase and magnitude with the voltage of the measured circuit. Instruments of this type become unsatisfactory when the current falls to about 20% of the full load value. In the constant potential systems of electrical distribution customarily employed the voltage remains relatively constant but the current varies with the magnitude and character of the load. It is one of the objects of my invention to provide an instrument which will be responsive to variations in phase of an electric current but independent of variations in the magnitude of the current.

In accordance with my invention I arrange an electric valve of the grid-controlled type to produce a rectified current varying in magnitude with phase relationship between its grid and anode excitations but independent of the magnitude of the grid excitation; I excite the anode from the voltage of the measured circuit and the grid by a potential varying in phase with the current in the measured circuit. The features of my invention which I believe to be novel and patentable will be pointed out in the claims appended hereto.

Figure 1:
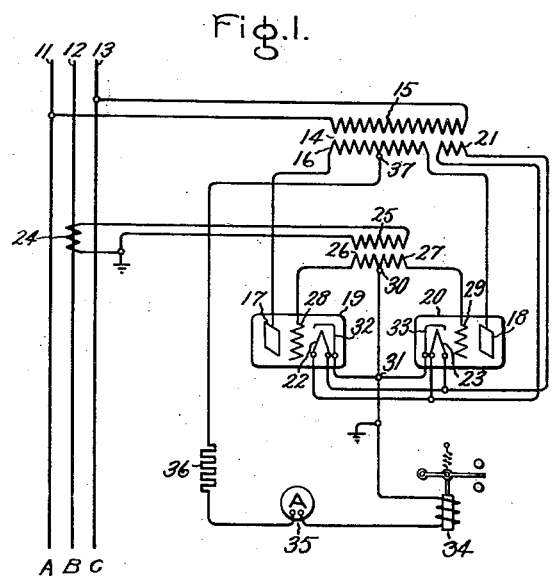
Figure 2:
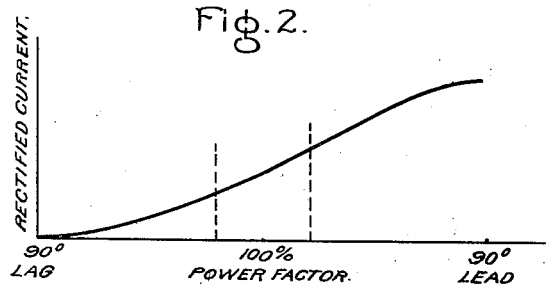
Figure 3:
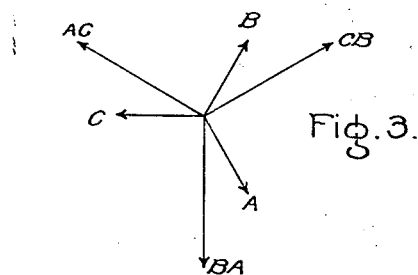

To afford a more complete understanding of my invention reference is made in the following description to the accompanying drawing in which Fig. 1 is a circuit diagram of one embodiment of my invention; Fig. 2 is a curve of rectified current plotted against power-factor; and Fig. 3 is a vector diagram showing the relationship between current and voltage in a three-phase circuit at 100% power-factor.

Referring to the drawing, I have shown a device responsive to the power-factor in a three-phase alternating-current circuit having the line conductors 11, 12 and 13, but it will be understood that my invention is not limited to polyphase circuits. In accordance with this embodiment I provide a potential transformer 14 having a primary winding 15 connected between line conductors 11 and 13 and a secondary winding 16, the opposite ends of which are connected to the anodes 17 and 18 of electric valves or discharge tubes 19 and 20. Transformer 14 also has a secondary winding 21 energizing the filaments 22 and 23 of the discharge tubes 19 and 20 respectively.

In order to control the output of the valves 19 and 20 in response to variations in the phase angle of the current of the three-phase circuit, I provide a current transformer 24 having its secondary winding connected to the primary winding 25 of a transformer 26. The opposite ends of the secondary winding 27 of transformer 26 are connected to the grids 28 and 29 of valves 19 and 20 respectively. The mid-point 30 of the secondary winding 27 is connected to the common terminal 31 of cathodes 32 and 33 of the valves 19 and 20. A direct-current measuring circuit is formed from terminal 31 through a current responsive device such as a relay 34 or a measuring instrument 35, or both, and resistor 36 to the mid-point 37 of transformer secondary winding 16. From mid-point 37 of winding 16 the circuit branches through opposite halves of transformer winding 16 and valves 19 and 20 respectively, to the common terminal 31. The current passes through valve 19 from anode 17 to cathode 32 during one-half cycle, and through discharge tube 20 from anode 18 to cathode 33 during the other half cycle of the alternating current wave in transformer 14.

The valves 19 and 20 are preferably of the vapor electric or of the gaseous arc type. It is well known to those skilled in the art that such valves may be so constructed that they will not pass a current until the grid is made positive with respect to the cathode. For example, the valve 19 may be so constructed that current will not start to flow between its anode 17 and cathode 32 until the potential of its grid 28 is made positive with respect to that of the cathode 32. After the anode current of the valve has started the grid potential has no further influence. When the anode current is brought to zero by some external agency, however, it cannot start again until the grid potential is made more positive than that of the cathode.

In the circuit shown the grid potential of valve 19 is positive when that of the valve 20 is negative and likewise the anode potential of valve 19 is positive when that of valve 20 is negative thereby causing both halves of the alternating-current wave to be utilized. Although I prefer to use a pair of valves for the sake of reliability and greater sensitivity, it will be understood that I am not limited to this exact arrangement. The valves shown are of the type in which the cathodes 32 and 33 are indirectly heated by filaments 22 and 23. But it will be understood that I may also use valves employing another type of cathode.

Valves 19 and 20 may be made conducting by very small values of positive grid voltage, and the current passing will be independent of the magnitude of the grid voltage. Obviously, the amount of lag of the current wave exciting the grid behind that exciting the anode will determine how large a portion of the half cycle of current each valve will conduct.

By exciting the grids through the voltages produced by the current transformer 24, the voltage of each grid is made to vary in the phase relationship with that of the anode as the current in the alternating current circuit varies in phase relationship with the voltage in the circuit. Referring to Fig. 3, the vectors A, B and C represent the currents flowing in conductors 11, 12 and 13 respectively, and the vectors BA, CB and AC represent the voltages between conductors 11 and 12, 12 and 13, 11 and 13, respectively, for a load of 100% power-factor. It will be seen that the current in one conductor is displaced 90 degrees from the voltage between the other two conductors. For lagging power-factors there will be a greater displacement and for leading power-factors a smaller displacement. By connecting the current transformer 24 in one conductor 12 and connecting the potential transformer 14 across the other two conductors 11 and 13 I obtain a phase displacement of 90 degrees between the voltages across the grids 28 and 29 and the anodes 17 and 18 respectively of the discharge tubes when the power-factor of the three-phase circuit is 100%.

For leading power-factors the current and consequently the grid voltages will be advanced in phase; for lagging power-factors the current and consequently grid voltages will be retarded in phase so that for a power-factor of 90 degrees leading the grid voltages and the anode voltages of the discharge tubes will be exactly in phase and for a power-factor of 90 degrees lagging the grid and anode voltages will be 180 degrees out of phase. Accordingly, the rectified current will be a minimum for a power-factor of 90 degrees lagging and a maximum for a power-factor of 90 degrees leading, as shown by the curve in Fig. 2. It will be understood that to obtain the full range of values indicated by the curve of Fig. 2 the ratio of resistance to inductance in the direct-current circuit must be kept relatively high and to this end I employ relatively high resistance devices 34 and 35, and I may make the series resistor 36 of relatively high resistance. However, if the power-factor variations of the circuit are relatively small, falling, for example, between the dotted lines in Fig. 2, a power factor responsive device of ample range may be produced without taking special precautions to eliminate inductance from the direct-current circuit.

Although I have shown an arrangement applicable to three-phase circuits for obtaining indications which increase progressively from 90 degrees lagging to 90 degrees leading, it will be understood that the arrangement shown is only illustrative and that other means for producing a suitable phase displacement between the grids and anodes of the valves at 100% power-factor will suggest themselves to those skilled in the art. Furthermore, it will be obvious that where it is not desired to differentiate between lagging and leading power-factors such means for displacing the grid and anode excitations are unnecessary.

By suitably calibrating the current responsive device 35 indications of power-factor may be obtained directly. Likewise by suitably calibrating the relay 34 my device may be arranged to connect or disconnect power-factor corrective appliances or to transmit indications of power-factor to a distance.

My device has an advantage over the ordinary induction type of power-factor instrument in that only very small load currents are required to cause the instrument to operate and the current required to operate the indicating or auxiliary devices is supplied by a source of independent of load current so that larger torques are available.

While I have described my invention in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States is:

1. In combination with a three-conductor polyphase alternating-current circuit, a pair of grid controlled vapor-electric devices each having an anode, a grid, and a cathode and arranged to produce a rectified current, means for oppositely exciting said anodes in response to the voltage between two of said conductors, means for oppositely exciting said grids in response to the current in the third of said conductors, and means responsive to said rectified current.

2. In combination with an alternating-current circuit, a power-factor responsive device comprising a rectifier having a cathode, an anode, and a control grid, means responsive to rectified current produced by said rectifier, means connected to said circuit for impressing on said anode an alternating potential varying in phase with the voltage of said alternating-current circuit, and means connected to said circuit for impressing on said grid an alternating potential varying in phase with the current in said circuit, at least one of said potentials being displaced in phase from the electrical quantity with which it varies an amount sufficient to cause the phase angle between the anode and grid potentials to differ by 90 degrees from the phase angle between the voltage and current of said measured circuit for the purpose of producing unequal responses with leading and lagging power-factors and causing the device to differentiate therebetween.

3. In combination with an alternating-current circuit, means responsive to the power-factor thereof comprising a potential transformer and a current transformer connected to said circuit, a grid-controlled vapor rectifier, and means responsive to the current rectified thereby, said rectifier having a cathode, an anode excited by the secondary of said potential transformer, and a grid excited by the secondary of said current transformer, said transformers being so connected that the currents therein are in quadrature when the power-factor of said circuit is unity.

4. A device responsive to the phase angle between two periodic quantities and independent of the magnitude of one of said quantities, said device comprising a grid-controlled arc rectifier having a cathode, a grid and an anode, means for causing the potential of said grid to vary with the periodic quantity of whose magnitude the device is to be independent, means for causing the potential of said anode to vary with the other of said periodic quantities, means responsive to the current flowing in said rectifier, and means whereby at least one of said potentials is displaced in phase from the periodic quantity with which it varies an amount sufficient to cause the phase angle between the anode and grid potentials to differ by 90 degrees from the phase angle between said periodic quantities, thereby making the device responsive to change in sign of the phase angle between said periodic quantities.

5. In combination with an alternating-current electric circuit, a device responsive to the phase angle between the voltage and current in said circuit and independent of the magnitude of the current therein comprising a grid-controlled rectifier having an anode and a grid, means responsive to the current flowing in said rectifier, means for impressing on said anode a potential varying with the voltage of said alternating-current circuit and means for impressing on said grid a potential varying with the current in said circuit.

LELAND F. STONE.